(12) United States Patent
Ligtenberg et al.

(10) Patent No.: US 7,740,922 B2
(45) Date of Patent: Jun. 22, 2010

(54) PROCESS FOR PRODUCING PIPE SLEEVES FROM MINERAL WOOL

(75) Inventors: Harald Ligtenberg, Kürten (DE); Anton Zysik, Kürten (DE); Jens Meyer, Hirschberg/Leutershausen (DE); Volker Albrecht, Lingenfeld (DE)

(73) Assignee: Saint-Gobain Isover, Courbevoie (FR)

( * ) Notice: Subject to any disclaimer, the term of this patent is extended or adjusted under 35 U.S.C. 154(b) by 569 days.

(21) Appl. No.: 10/553,188

(22) PCT Filed: Apr. 14, 2004

(86) PCT No.: PCT/EP2004/003918

§ 371 (c)(1), (2), (4) Date: Nov. 1, 2005

(87) PCT Pub. No.: WO2004/091910

PCT Pub. Date: Oct. 28, 2004

(65) Prior Publication Data

US 2006/0141177 A1 Jun. 29, 2006

(30) Foreign Application Priority Data

Apr. 17, 2003 (DE) ................. 103 17 937

(51) Int. Cl.
| | |
|---|---|
| B29D 22/00 | (2006.01) |
| B65H 18/28 | (2006.01) |
| B65H 39/14 | (2006.01) |
| B31C 1/00 | (2006.01) |
| B29C 63/10 | (2006.01) |

(52) U.S. Cl. ................... 428/34.1; 242/160.1; 242/528; 156/184; 156/188

(58) Field of Classification Search ................ 428/34.1; 242/160.1, 528, 530.2, 439.5, 440.1, 444–444.3, 242/570, 430; 156/184, 188, 190, 192

See application file for complete search history.

(56) References Cited

U.S. PATENT DOCUMENTS 3,346,016 A * 10/1967 Blau et al. .................. 138/138

(Continued)

FOREIGN PATENT DOCUMENTS

DE 31 44 193 A1 5/1983

(Continued)

OTHER PUBLICATIONS

Definition of Roll; Merriam-Webster Online; http://www.merriam-webster.com/dictionary/roll; 2009.*

*Primary Examiner*—Rena L Dye
*Assistant Examiner*—James Yager
(74) *Attorney, Agent, or Firm*—The Nath Law Group; Jerald L. Meyer; Stanley N. Protigal

(57) ABSTRACT

The invention relates to a process for producing pipe sleeves made of mineral wool for insulating pipelines or for reducing the sound level in pipeline systems, comprising the following steps: providing a nonwoven web (11) made of mineral wool which is provided with an uncured binder, winding up the nonwoven web (11) on a winding mandrel (2) of a winder, curing the binder. Here, at least one reinforcing layer (12, 13) is provided before the nonwoven web (11) runs into the winder, in such a way that during the winding the said reinforcing layer becomes a constituent part of the pipe sleeve produced as a result.

14 Claims, 3 Drawing Sheets

U.S. PATENT DOCUMENTS

| | | | |
|---|---|---|---|
| 3,824,140 A | 7/1974 | Hofmann | |
| 4,576,206 A | 3/1986 | Lauren | |
| 4,687,530 A | 8/1987 | Berscheid et al. | |
| 5,056,564 A * | 10/1991 | Roth | 138/149 |
| 5,457,136 A * | 10/1995 | Hartranft et al. | 521/109.1 |

FOREIGN PATENT DOCUMENTS

| | | |
|---|---|---|
| DE | 32 02 185 A1 | 8/1983 |
| DE | 32 05 185 A1 | 8/1983 |
| DE | 35 36 174 C1 | 7/1986 |
| GB | 1 214 330 | 12/1970 |
| GB | 2 032 845 A | 5/1980 |
| JP | 55-115823 U | 8/1980 |
| JP | 1-87336 A | 3/1989 |
| JP | 9-11374 A | 1/1997 |
| SU | 1558310 A3 | 4/1990 |

* cited by examiner

PROCESS FOR PRODUCING PIPE SLEEVES FROM MINERAL WOOL

The invention relates to a process for producing pipe sleeves from mineral wool according to the preamble of claim 1, and also to pipe sleeves which contain a wound nonwoven web made of mineral wool with a cured binder.

Pipe sleeves of this type are frequently used to insulate pipelines in order to minimise energy losses, for example in heating and service-water lines. The insulating layer of such pipe sleeves is generally produced by winding a nonwoven web made of mineral wool onto a mandrel of a winder and, as explained in DE 35 36 174 C1, can have an additional external lamination of a thin metal sheet. By means of this lamination, which is usually a thin aluminium sheet, an improvement in the compressive strength of the pipe sleeve, in particular in the radial direction, is conventionally achieved. Furthermore, the metal lamination also provides a trickle guard against any loose fibrous material possibly present in the pipe sleeve.

Such conventional pipe sleeves for insulating pipelines have been tried and tested, but, in particular, the process step of applying the metal lamination entailing a relatively great deal of effort and being relatively expensive. If, on the other hand, the metal lamination is dispensed with, then this is associated with the problem of a possibly increased accumulation of dust and, and the same time, a worsened feel and strength of the pipe sleeve.

In a further area of application, pipe sleeves of this type are also used to reduce the sound level in pipeline systems, for example of heating installations (chimney systems) or ventilation systems. Here, it is in particular a matter of largely nullifying the sound energy of the gases flowing through, by the sound waves being reflected and absorbed in a suitable manner. To this end, the pipes and pipe systems carrying gas are provided in the region of the pipe sleeve with normally empirically defined apertures, through which the gas can expand into the space between the pipe and an external housing. Since this space is filled with a packing of mineral wool, the gas oscillations and therefore also the sound waves are damped effectively.

The sound-level-reducing effect is of course maintained only as long as the mineral wool filling is present and substantially fills the space allocated to it completely. Since, however, mineral wool consists of a large number of fibres bonded to one another by means of binders, this inner bond can be dissolved, in particular in the case of mechanical action or else by the gas stream, so that individual fibres can migrate out of the bond. This should be prevented with regard to a decrease in the sound-level reduction, but also because the fibre fragments must not be expelled with the gases, in order to avoid an uncontrollable contamination and pollution of the environment and, ultimately, also risks to health.

One example of such a pipe sleeve is explained in DE 31 44 193 A1. This known pipe sleeve has an insulating layer of mineral wool, which is formed by a nonwoven web which, in the manner conventional in the production of pipe sleeves, has been wound over a winding mandrel which, after the mineral fibre pipe sleeve has been removed, leaves behind a passage opening for the pipe. In order to protect the pipe sleeve and, in particular, the outer circumferential surface against mechanical damage and therefore to avoid fibre fracture or fibre discharge, this known pipe sleeve is also given a sheath of a woven glass fabric. This sheath also has a reduced diameter as compared with the insulating layer, so that the insulating layer is present in a somewhat compressed state within the sheath, which achieves securing of the position and also beneficial spring properties and improved mechanical integrity of the arrangement. This pipe sleeve has been tried and tested in practice; however, in order to produce this type of pipe sleeve, apart from the separate production steps for the components, in particular the mounting step for the insertion of the insulating layer into the sheath is also required, which is complicated and presents problems, in particular in the case of relatively large numbers.

The invention is based on the object of indicating a process for producing pipe sleeves which can be carried out cost-effectively with little effort and, firstly, leads to pipe sleeves with improved mechanical properties and/or, secondly, to pipe sleeves with mechanical properties which are approximately constant as compared with conventional pipe sleeves but have lower bulk densities.

From a process engineering point of view, this object is achieved by the features of Claim 1. This comprises the following steps: providing a nonwoven web made of mineral wool which is provided with an uncured binder, winding up the nonwoven web on a winding mandrel of a winder, curing the binder, at least one reinforcing layer being provided before the nonwoven web runs into the winder, in such a way that during the winding the said reinforcing layer becomes a constituent part of the pipe sleeve produced as a result.

Thus, according to the invention, it is possible to achieve an improvement in the mechanical properties, with an astonishingly low technological outlay and without having to interrupt the conventional production process and in particular the winding operation. In particular, the mechanical strength of the pipe sleeve may thus be improved, as a result of which the risk of fibre breakage, for example under external mechanical influences, can be reduced considerably. The procedure according to the invention is also suitable in particular for large-scale mass production, as a result of which pipe sleeves of this type can thus be produced more economically.

Furthermore, as a result of introducing the reinforcing layer, specific control of the strength properties of the pipe sleeve to be produced becomes possible, so that appropriate adaptations with respect to the bulk density to different uses, etc., can be carried out in process engineering terms with particularly little effort, that is to say bulk density can be saved as a result of the reinforcing effect of the reinforcing layer or layers, in spite of maintaining the stability of the pipe sleeves.

Advantageous developments of the process according to the invention form the subject-matter of the dependent Claims 2 to 7.

Thus, the at least one reinforcing layer can be applied to the nonwoven web in such a way that it is wound up with the latter and, following winding, is present within the pipe sleeve. In this way, the mechanical properties of the pipe sleeve to be produced can be set specifically and improved without the external appearance standing out from the prior art. In addition to the stabilisation of the pipe sleeve, it is simultaneously also possible to achieve a reduction in the bulk density by means of suitable selection of the reinforcing material, so that a reduction in the overall weight of the pipe sleeve produced may be achieved. Furthermore, the addition of the reinforcing layer to the nonwoven web to be wound up can be carried out without difficulty, even on a large scale, so that great improvements with regard to the material properties can be achieved with only minimally increased effort on process engineering.

In this case, it is of further advantage if the reinforcing layer comprises a plurality of separate strips, which are each placed on the nonwoven web and then wound up together with the latter. In this way, the input of the reinforcing material can be controlled in a manner which is particularly beneficial in terms of process engineering. These strips can be deposited without difficulty at a desired, predetermined point and in a desired relation to one another on the nonwoven web, which is normally brought up on a transport element, and are then automatically wound in together with the said nonwoven web.

As an alternative or additionally to this, it is also possible to add the reinforcing layer to the trailing end of the nonwoven web in such a way that it comes to lie on the outside of the pipe sleeve with the effect of a lamination, as the last layer arranged over the entire circumference. Therefore, an external sheath or lamination can be provided, as already proposed in DE 35 36 174 C1 explained at the beginning or DE 31 44 193 A1, but there can be arranged only with a considerable effort in terms of process engineering. According to the invention, this effort can now be reduced drastically, since the corresponding reinforcing layer is automatically wound around. Since the winding operation is usually likewise associated with a certain amount of compression of the mineral wool material, according to the invention, a certain prestress of the mineral wool material with respect to the sheath of reinforcing material can be produced to the same extent as in the prior art, so that beneficial spring-back properties and mechanical characteristics of the final product can be achieved. By means of the reinforcing layer wound around the outside of the pipe sleeve according to the invention, reliable trickle protection can be provided, a smoother surface also being produced as well. A pipe sleeve formed in this way may be handled more conveniently. Furthermore, a higher mechanical strength of the pipe sleeve can be achieved cost-effectively.

In a further alternative or supplementary configuration, the at least one reinforcing layer can be applied to the winding mandrel, before the nonwoven web is wound up, in such a way that it represents the internal surface of the pipe sleeve determining the clear internal diameter of the pipe sleeve. Configuring the pipe sleeve in this way is advantageous in particular in the use for a sound level reduction in pipeline systems, for example of heating installations or ventilation systems, so that the cohesion of the bonded mineral water fibres can be maintained reliably even under the action of a gas flowing through and, in particular, a type of trickle protection against the emergence into the pipeline system of particles possibly nevertheless loosened can be prevented reliably. In other words, the abrasion, that is to say fibre abrasion, at relatively high air or gas velocities is intended to be prevented thereby. The "internal lamination", formed in this way, of the pipe sleeve may be provided in this case cost-effectively and with little effort on process engineering.

It is particularly advantageous if a glass nonwoven, a woven glass fibre fabric, for example E-glass or the like, is used as reinforcing layer. These have proven to be advantageous in practical trials since, in addition to a comparatively low bulk density, they have good mechanical properties and can be wound together with the nonwoven web without difficulty.

Furthermore, before being provided for the winding operation, the reinforcing layer can be wetted with additional binder, by which means, following the curing of the binder, an improved bond in the moulding produced in this way can be achieved. This additional binder can for example simply be sprayed onto the reinforcing layer supplied, with particularly little effort on process engineering.

According to a further aspect of the present invention a pipe sleeve made of mineral wool as defined in Claim 8 is provided, which is produced by means of a process according to any of Claims 1 to 7. Such pipe sleeve shows the advantageous effects as mentioned above with regard to the method claims.

In particular, according to Claim 9, a pipe sleeve made of mineral wool is provided for insulating pipelines, which is formed of a wound nonwoven web with cured binder and in which there is at least one reinforcing layer on the inner side of the pipe and/or enclosed at at least part of the boundary between successive wound layers.

Preferably, the at least one reinforcing layer is enclosed within the wound layers. This can therefore serve as a type of "reinforcement" within the pipe sleeve, which means that the mechanical strength of the pipe sleeve can be improved. However, it is particularly advantageous to use these improved mechanical properties to reduce the bulk density of the pipe sleeve and thus to reduce the production costs. The pipe sleeve according to the invention is thus distinguished by an excellent ratio of volumetric weight to mechanical strength, being capable of production cost-effectively to a great extent and on a large scale.

In this case, the reinforcing layer can comprise a plurality of separate strips, which means that the mechanical properties of the pipe sleeve can be set specifically. In particular, a suitable balance between a reduction in bulk density and an improvement in the mechanical strength can be produced in this way.

In another embodiment, as defined in Claim 12, a reinforcing layer may be provided in the form of a trickle guard being wound circumferential around the pipe sleeve. In this way, an improved surface can be produced on the circumferential surface of the pipe sleeve, which permits the pipe sleeve to be reinforced with respect to external mechanical influences. Therefore, the risk of fibre breakage in the event of improper handling, etc. can be reduced substantially, so that discharge of fibre can be avoided to the greatest possible extent. In addition, this sheath, serving as a type of "lamination", of reinforcing material suppresses the discharge of fibre to a substantial extent and is felt to be more pleasant and smoother during handling. This makes it easier to handle the pipe sleeve according to the invention, for example during installation. As compared with a thin metal sheet which, because of its stiffness, can automatically be supplied exactly, this is not possible with glass nonwovens serving as a trickle guard, because of their deficient inherent stability, for which reason the process according to the invention constitutes a simple and effective possible way of doing this.

According to a further aspect of the invention, as defined in claim 13, a pipe sleeve made of mineral wool is provided for sound-level reduction in pipeline systems, in particular of low-temperature heating installations (flue installations) or ventilation systems, the pipe sleeve being formed from a wound nonwoven web with cured binder and having at least one reinforcing layer, which provides the inner surface of the pipe sleeve, determining the clear internal diameter of the pipe sleeve. Therefore, the expansion space required for the damping of gas oscillations or sound waves continues to be available in the pipe sleeve and, at the same time, a type of trickle protection against particles which may have been loosened is provided. In practical trials, this configuration has proven to be suitable in particular for absorbing pressure peaks in the gas flow, such as normally occur in heating or ventilation installations primarily during start-up, since part of the combustion noise is transported to the outside via the waste gas path. In particular, the requirements on the prevention of noise in building constructions, which are laid down in DIN 4109 and Technical Note Noise can therefore be met.

The reinforcing layer used is preferably a glass nonwoven, a woven glass fibre fabric of E-glass or the like, which exhibit the advantages already explained.

Moreover, the reinforcing layer may include particulate material, such as infrared radiation absorbing material or heat shielding material in order to improve the properties of the pipe sleeve according to the invention.

Further, the reinforcing layer may include a foil material, such as a heat reflective foil containing a metal like aluminum.

The reinforcing layer may be treated with a biocide agent.

Moreover, the reinforcing layer may be provided with means for allowing separation of wound layers in order to reduce external or internal diameter of the pipe.

The invention will be explained in more detail in exemplary embodiments, using the Figures of the drawing, in which.

Figure 1:
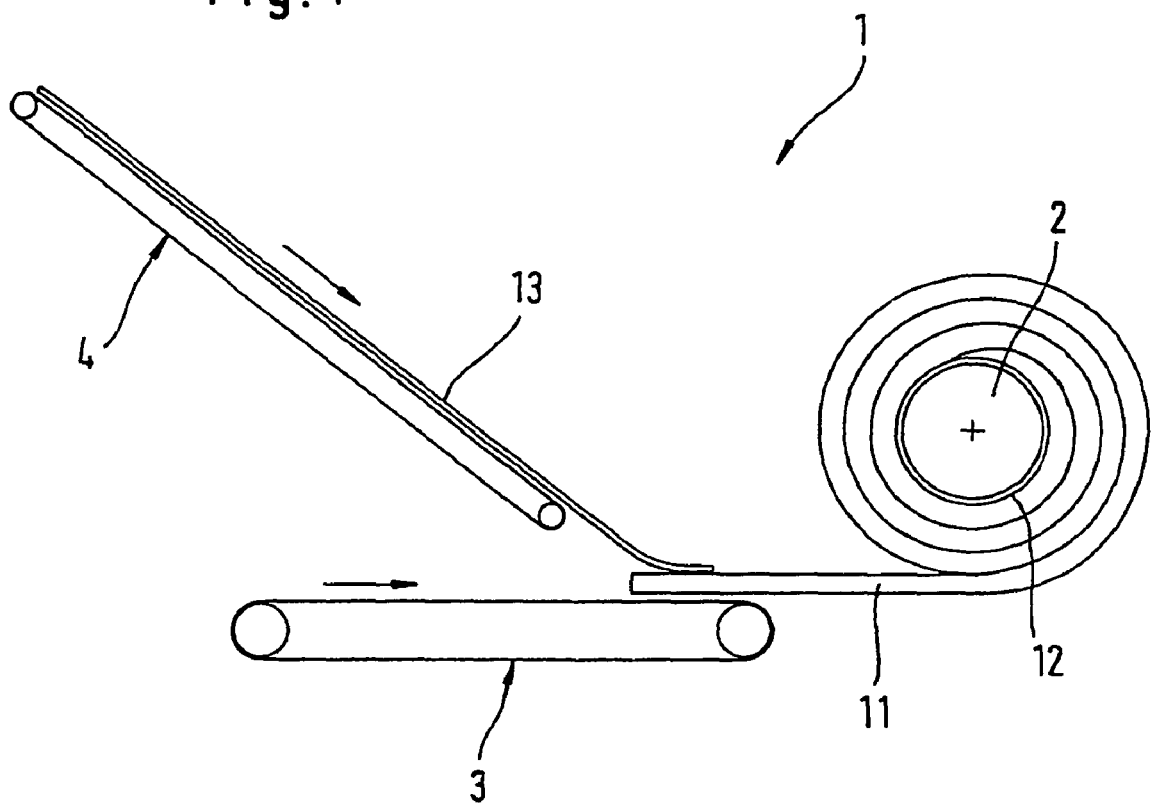
FIG. 1 shows a schematic view of a winder adapted according to the invention.

FIG. 1 shows, highly schematically, a side view of a winder 1, on which a pipe sleeve 10 (cf. FIG. 2) according to a first embodiment is produced. The winder 1 has a winding mandrel 2, onto which a nonwoven web 11 made of mineral wool, supplied by a first supply belt 3, is wound in an intrinsically conventional manner.

In the illustration shown, the nonwoven web 11 has already been substantially wound on the winding mandrel 2, an inner reinforcing layer 12 having been placed on the winding mandrel 2 before the start of the winding operation and, in this way, in the course of the winding operation, becoming an integral constituent part of the pipe sleeve 10 to be produced.

In addition to this, the winder 1 contains a second supply belt 4, by means of which an outer reinforcing layer 13 can be supplied in such a way that its leading end overlaps the trailing end section of the nonwoven web 11 such that it is also wound into the coil. As a result of the further rotation of the winding mandrel 2, the reinforcing layer 13 is ultimately led around the entire periphery of the existing coil, and its trailing end overlaps its leading end in a manner that can be seen schematically from FIG. 2. The reinforcing layer 13 therefore comes to lie completely circumferentially around the coil and forms an outer sheath or lamination around the latter.

Figure 2:
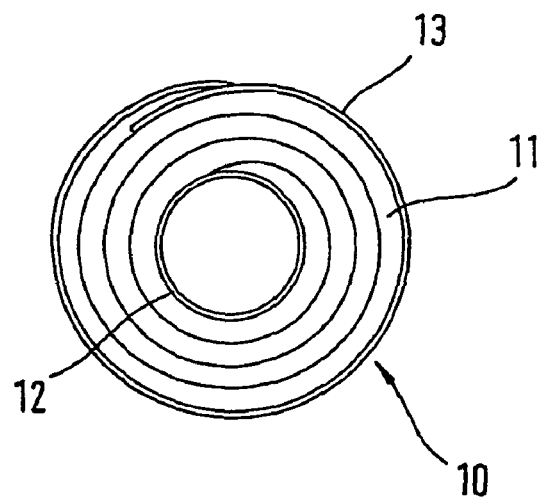
FIG. 2 shows a front view of a pipe sleeve according to a first embodiment produced by means of the winder according to FIG. 1.

In a following curing step, the binder in the moulding formed in this way is cured and the latter thus becomes the pipe sleeve 10, from which the winding mandrel 2 is then withdrawn, so that ultimately the pipe sleeve 10 is present in the shape that can be seen from FIG. 2.

Figure 4:
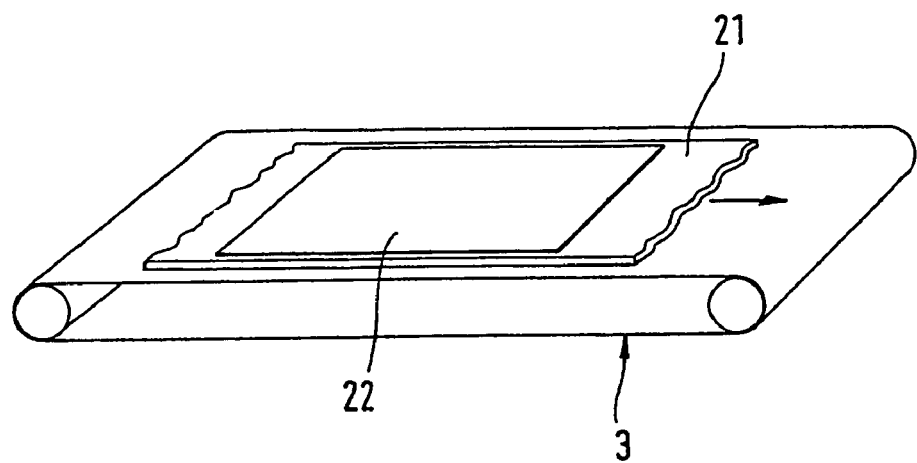
FIG. 4 shows the details of the supply belt of the winder during the production of the second embodiment of a pipe sleeve.
Figure 3:
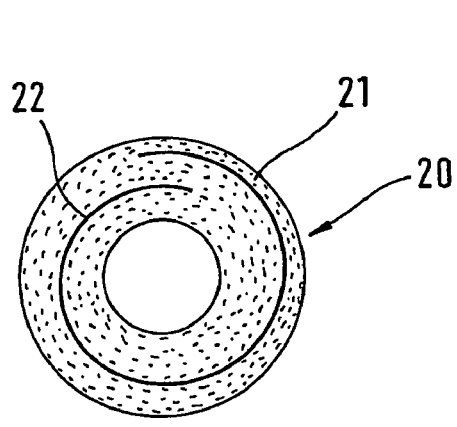
FIG. 3 shows a front view of a second embodiment of a pipe sleeve according to the invention.
Figure 5:
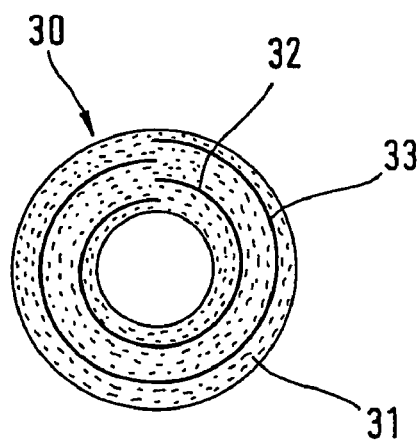
FIG. 5 shows a front view of a pipe sleeve in a third embodiment.

FIGS. 3 to 5 show a modified embodiment of the invention, in which the reinforcing layer is introduced in the form of strips in the course of the winding operation. Thus, FIG. 3 shows a front view of a pipe sleeve 20 according to a second embodiment of the invention. In this, a reinforcing layer 22 is also wound in inside a nonwoven web 21. For this purpose, in the manner that can be seen from FIG. 4, the reinforcing layer 22 is placed on the nonwoven web 21 supplied to the winder 1 by the first supply belt 3.

FIG. 5 shows a third embodiment, according to which a pipe sleeve 30 has two integrated reinforcing layers 32 and 33 in a nonwoven web 31. These have been placed on the nonwoven web 31 separately from one another at specific times before the winding operation.

Figure 6:
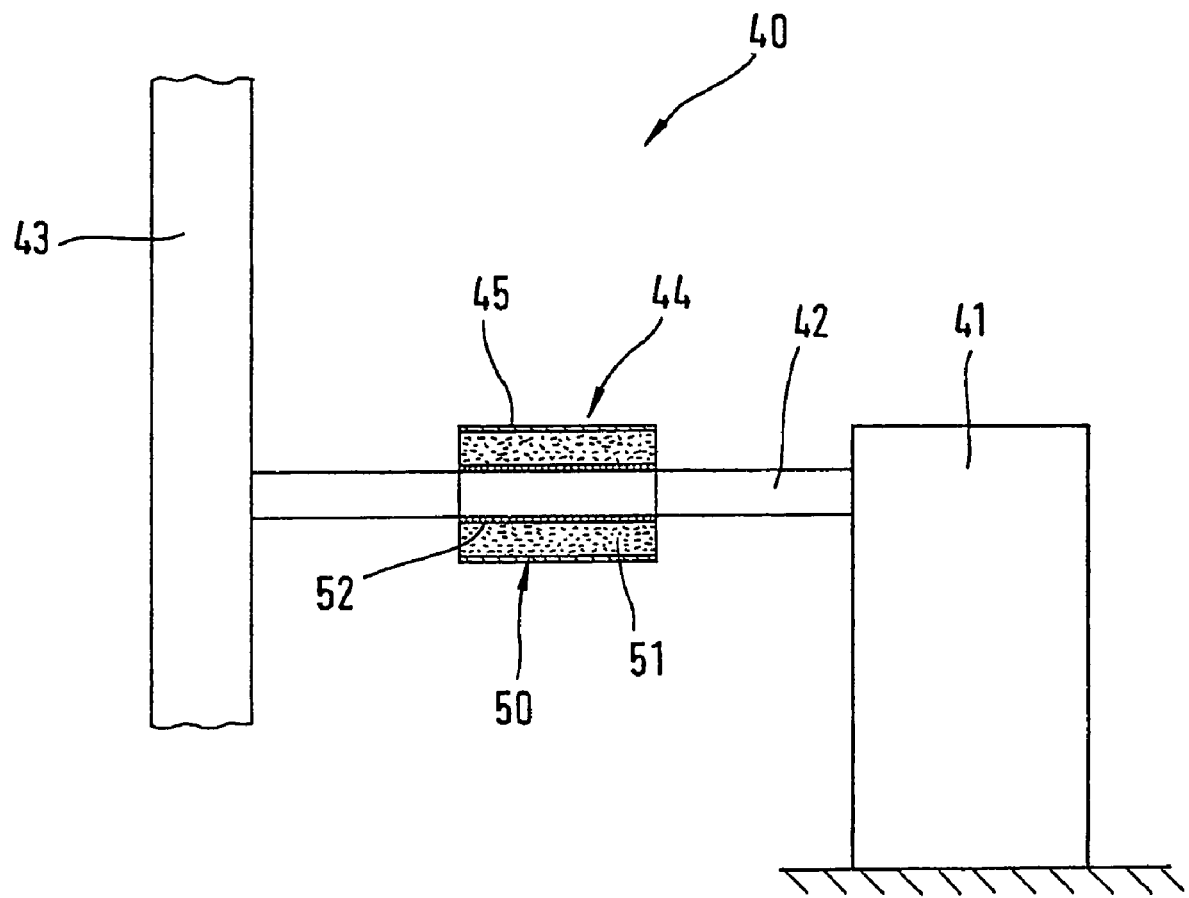
FIG. 6 shows an exemplary application in a heating installation.

The pipe sleeves 20 and 30 are configured in such a way that they can preferably be used for insulating pipelines. Another method of using the pipe sleeve 10 is shown in FIG. 6. In this schematic illustration, a heating installation 40 has a heating block 41, a waste-gas pipe 42 and a flue 43, it being possible for the waste gases from the low-temperature heating installation, formed for example as an oil or gas heating system, to be led to the flue 43 via the waste-gas pipe 42.

Interposed in the waste-gas pipe 42 is a sound-level-reducing device 44 comprising a housing 45, which encloses a pipe sleeve 50 according to a fourth embodiment but which corresponds to the pipe sleeve 10 with the exception of an outer reinforcing layer 13 which may possibly be present.

The pipe sleeve 50 contains a wound nonwoven layer 51 and also an inner reinforcing layer 52, which provides the inner surface determining the clear internal diameter of the pipe sleeve 50. This inner reinforcing layer 52 is formed from an E-glass nonwoven and therefore has apertures through which the gas stream can expand into the wound nonwoven layer 51. Therefore, the pressure peaks occurring in particular during start-up of the heating installation 40 can be dissipated in the device 44, reducing the sound level. At the same time, the reinforcing layer 52 to the greatest extent prevents discharge of particles loosened by the action of the flow into the waste-gas pipe 42 or the flue 43. As a further protection against the flowing waste gases, it is possible for a fine-mesh wire basket to be arranged in the inside of the housing 45, in front of the reinforcing layer 52.

The invention permits further approaches to configuration in addition to the embodiments indicated.

For example, the reinforcing layer can also be provided in such a length and projecting both beyond the leading and beyond the trailing end of the nonwoven web in such a way that, in the course of the winding operation, both the reinforcing layer forming the inner surface of the pipe sleeve and the reinforcing layer integrated within the wound layers, and the reinforcing layer forming the outer sheath, are provided from one piece.

Furthermore, it is not absolutely necessary for the leading end of the reinforcing layer 13 to overlap the trailing end of the nonwoven web 11 in the manner shown in FIG. 1; instead, the reinforcing layer 13 can also be introduced into the winding operation immediately following the nonwoven web 11. The reinforcing layer 13 can, furthermore, also be supplied to the nonwoven web 11 from below.

The inner reinforcing layer 12 or 52 can also be placed on the winding mandrel 2 separately in advance; alternatively, it is also possible that this is likewise supplied by supply belts and wound around the winding mandrel 2 in a conventional way, the winding of the nonwoven web 11 or 51 then following.

The length and width dimensions of the respective reinforcing layers in all the exemplary embodiments are selected in accordance with the desired properties of the final product, so that, for example, a reinforcing layer can also be designed to be sufficiently long that it overlaps itself more or less considerably in the coil. However, the width of each reinforcing layer is preferably selected such that it corresponds to the width of the respective nonwoven web, in order in this way to permit the advantageous properties also to come into effect uniformly over the entire product.

Also, the reinforcing layer may include particulate material such as infrared radiation absorbing material. As disclosed in WO 02/092528, a suitable IR absorbing and scattering material absorbs and scatters infrared radiation with a wavelength in the 4 to 40 µm range. Preferably, the IR absorbing and scattering material absorbs 6-8 µm (1667-1250 cm$^{-1}$) infrared radiation. The IR absorbing and scattering material can include borate compounds, carbonate compounds, alumina compounds, nitrate compounds and nitrite compounds. These compounds can be alkali metal salts or alkaline earth metal salts. Borate compounds, carbonate compounds and alumina compounds are preferred. Suitable borates include lithium borate, sodium borate, potassium borate, magnesium borate, calcium borate, strontium borate and barium borate. Preferably, the borate is sodium borate (i.e., borax, $Na_2B_4O_5(OH)_4 \cdot 8H_2O$ or $Na_2B_4O_7 \cdot 10H_2O$) or colemanite ($Ca_2B_6O_{11} \cdot 5H_2O$). Suitable carbonates include lithium carbonate, sodium carbonate, potassium carbonate, calcium carbonate (i.e., calcite, $CaCO_3$), dolomite ($CaMg(CO_3)_2$), magnesium carbonate (i.e., magnesite, $MgCO_3$), strontium carbonate and barium carbonate. Preferably, the carbonate is calcium carbonate, dolomite, or magnesite. Suitable alumina compounds include hydrated alumina ($Al_2O_3 \cdot 3H_2O$ or $Al(OH)_3$) and alumina ($Al_2O_3$). ALCOA produces HYDRAL and B-303 particles of hydrated alumina.

Moreover, the reinforcing layer may include particulate material such as heat shielding material. Heat shielding material can be selected among phosphorous compounds, such as alkaline-earth phosphate especially a calcium phosphate. Calcium phosphates, especially the orthophosphate ($Ca_3(PO_4)_2$) and the pyrophosphate ($Ca_2P_2O_7$), are known to be refractory and these compounds have melting points of 1670° C. and 1230° C., respectively. The phosphorus compound may also be a compound chosen from the following compounds:

ammonium salts, ammonium phosphates, especially ammonium hydrogen phosphate (called AHP), ammonium dihydrogen phosphate (called ADP) and polyphosphates (especially of the metaphosphate and pyrophosphate types).

These ammonium salts may be pure or may include organic radicals;

phosphoric acid in its various forms, especially orthophosphoric acid ($H_3PO_4$), metaphosphoric acid and polyphosphoric acid ($[HPO_3]$);

aluminum hydrogenophosphates, especially aluminum hydrogen phosphate or aluminum dihydrogen phosphate, by themselves or mixed with orthophosphoric acid.

The invention claimed is:

1. Process for producing pipe sleeves made of mineral wool for insulating pipelines or for reducing the sound level in pipeline systems, comprising:
   a) providing a nonwoven web suitable for winding about a mandrel, the nonwoven web made of mineral wool which is provided with an uncured binder;
   b) winding up the nonwoven web on a winding mandrel of a winder in a manner whereby a leading end of the nonwoven web overlaps a trailing end of the nonwoven web to form a coil about the mandrel;
   c) curing the binder;
      supplying at least one reinforcing layer into the winder before the nonwoven web runs into the winder during the winding up of the nonwoven web to at least partially embed the reinforcing layer within the roll of nonwoven web, thereby providing said at least one reinforcing layer before inclusion of the nonwoven web in the pipe sleeve, and providing said at least one reinforcing layer in such a way that during the winding said reinforcing layer becomes an integral constituent part of the pipe sleeve produced as a result; and
   providing an outer sheath reinforcing layer added to a trailing end section of the nonwoven web whereby a leading end of the outer sheath reinforcing layer overlaps the trailing end section of the nonwoven web, after providing the reinforcing layer in such a way that said outer sheath reinforcing layer comes to lie on the outside of the pipe sleeve with the effect of a lamination, as an outer layer, the outer sheath reinforcing layer thereby including the leading end of the outer sheath reinforcing layer wound into and embedded within the coil, arranged around the full circumference, and extending completely circumferentially around the coil.

2. Process according to claim 1, characterized in that the at least one reinforcing layer is applied to the nonwoven web in such a way that said reinforcing layer is wound up with said nonwoven web and, following winding, is present within the pipe sleeve.

3. Process according to claim 2, characterized in that the reinforcing layer comprises a plurality of separate strips, which are in each case placed on the nonwoven web and are then wound up together with the latter.

4. Process according to claim 1, characterized in that the at least one reinforcing layer is applied to the winding mandrel before the winding of the nonwoven web in such a way that said reinforcing layer provides the inner surface of the pipe sleeve determining the clear internal diameter of the pipe sleeve.

5. Process according to claim 1, characterized in that the reinforcing layer is a glass nonwoven or a woven glass fibre fabric.

6. Process according to claim 1, characterized in that the reinforcing layer is wetted with additional binder before being provided for the winding operation.

7. Pipe sleeve made of mineral wool for insulating pipelines or for reducing the sound level in pipeline systems, the pipe sleeve formed of a wound nonwoven web with cured binder produced by means of a process according to claim 1.

8. Process according to claim 1, characterized in that the reinforcing layer is enclosed within the wound layers.

9. Pipe sleeve made of mineral wool for sound-level reduction in pipeline systems, in particular of heating installations or ventilation systems, characterized in that:
   said pipe sleeve has at least one reinforcing layer which provides the inner surface of the pipe sleeve that determines the clear internal diameter of the pipe sleeve,
   a roll of nonwoven web made of mineral wool wound about a mandrel supplied in a manner whereby at least a portion of the nonwoven web overlaps at least another portion of the nonwoven web to form a coil about the mandrel,
   an outer sheath reinforcing layer in the form of a trickle guard is wound circumferentially around said pipe sleeve, the outer sheath added to a trailing end of the roll of nonwoven web and wound fully circumferentially around the roll of nonwoven web with a leading end of the outer sheath reinforcing layer overlapping the trailing end of the roll of nonwoven web, at least partially embedded within the roll of nonwoven web thereby including the leading end of the outer sheath reinforcing layer wound into the coil, arranged around the full circumference, and extending completely circumferentially around the coil, and the outer sheath reinforcing layer provided as one of or a combination of a glass nonwoven or a woven glass fibre fabric; or includes one of a particulate material, a particulate infrared radiation absorbing material or a particulate heat shielding material; or includes one of a foil material, or a heat reflective foil containing a metal; or is treated with a biocide agent.

10. Process according to claim 1, characterized in that the reinforcing layer includes one of a particulate material, a particulate infrared radiation absorbing material or a particulate heat shielding material.

11. Process according to claim 1, characterized in that the reinforcing layer includes one of a foil material, or a heat reflective foil containing a metal.

12. Process according to claim 1, characterized in that the reinforcing layer is treated with a biocide agent.

13. Process according to claim 1, characterized in that the reinforcing layer is a glass nonwoven or a woven E-glass fibre fabric.

14. Process according to claim 1, characterized in that the reinforcing layer includes one of a foil material, or a heat reflective foil containing aluminum metal.

* * * * *